Oct. 4, 1955  DE WITT F. GERSTLE  2,719,344

SAFETY DIAPER PIN

Filed Nov. 17, 1954

INVENTOR
DE WITT F. GERSTLE
BY
HIS  ATTORNEY

United States Patent Office 2,719,344
Patented Oct. 4, 1955

2,719,344

SAFETY DIAPER PIN

De Witt F. Gerstle, Dayton, Ohio

Application November 17, 1954, Serial No. 469,334

2 Claims. (Cl. 24—156)

This invention relates to safety pins and particularly safety pins used to fasten infants diapers.

The common safety pin, when used to fasten diapers has its perforating stem portion pushed through the layers of the diaper in a direction toward the body of the infant. If extreme care is not taken, painful pricking of the infant may easily result, especially if a novice is performing the operation.

It is among the objects of the present invention to provide a safety pin which is so designed and constructed that the diaper perforating pin portion or tine is forced through the layers of the diaper in a direction away from the body of the infant, thus avoiding pricking of the infant.

The common safety pin is so constucted that ofttimes the placing of the perforating stem in the retainer head becomes an awkward operation, irritating to both the attendant and the infant.

A further object of the present invention is to provide a safety diaper pin having a resilient guard member normally biased positively to engage the tine. This permits opening of the pin by merely flexing the guard, the inherent bias of the guard returning said guard into tine engaging position when released.

Further objects and advantages of the present invention will be apparent from the following description, reference being had to the accompanying drawings in which a preferred form of construction is illustrated.

Figure 1:
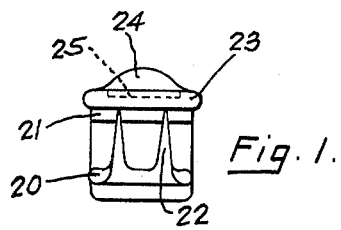
Fig. 1 is an end view of a closed safety pin made in accordance with the present invention.
Figure 2:
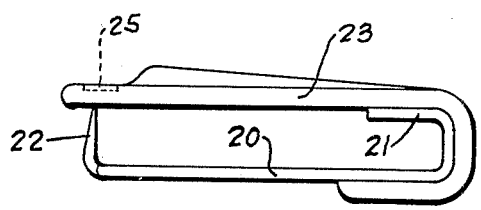
Fig. 2 is a side view of the pin shown in Fig. 1.
Figure 3:
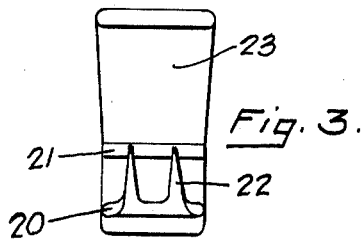
Fig. 3 is an end view of the pin opened for use.

Referring to the drawings, the safety pin is shown consisting of a stiff, metal pin member 20, preferably made of stainless steel. One end of this pin member has double right angled bends forming the mounting platform 21, the other end of the member 20 being bent to form the tang or tine 22.

Figure 4:
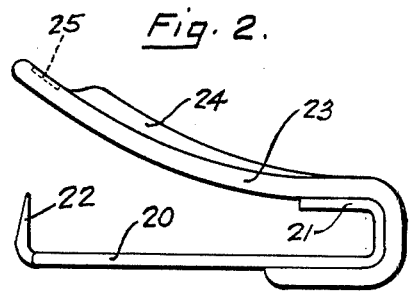
Fig. 4 is a side view of the pin shown in Fig. 3.
Figure 5:
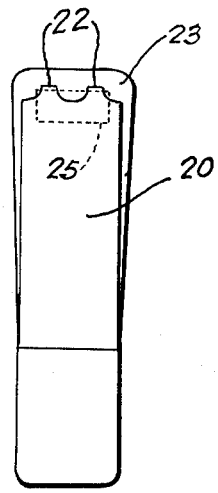
Fig. 5 is a bottom view of the pin of Fig. 3.

A clamping guard 23, made of any suitable resilient material, preferably rubber, has its one end portion fitted upon and vulcanized to the platform 21. The free end of the guard extends over and beyond the tine 22. Guard 23 is biased normally to engage the pointed end of the tine 22, and is capable of being flexed, as shown in Fig. 4, to open the pin for insertion of the diaper layers to be secured together by the pin. The tine having been forced through the diaper layers, guard 23 is then released permitting it, in response to its bias, to reengage the pointed tine. A longitudinal rib 24 is provided on the guard, this rib exerting a biasing effect on the guard toward the tine. Alined with the point of contact between the guard and tine, but on the side of the guard opposite said point of contact, a hard insert 25, preferably of hard rubber, is attached to the guard. This insert prevents complete penetration of the guard by the tine in case the user presses the guard upon the tine after each penetration of the diaper layers by said tine.

Figure 6:
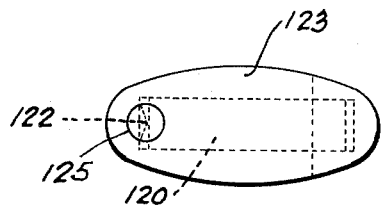
Fig. 6 is a top view of a modified form of pin.
Figure 7:
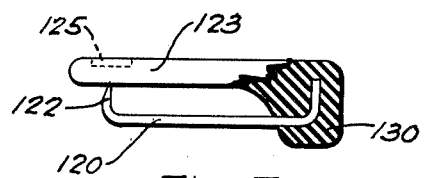
Fig. 7 is a part sectional view of the pin of Fig. 6.

The modified form of construction shown in Figs. 6 and 7, has a metallic member 120 with an angular bend at each end, one end providing a tine 122, the other end being embedded in the enlarged head portion 130 of the flexible guard 123 during its molding process. Guard 123 is biased normally to engage the pointed end of the tine 122, a hard insert 125 in the guard preventing complete penetration of the guard by said tine.

By proper use of the diaper pin of the present invention painful and what might be dangerous pricking of the infant's body may be completely eliminated. The metallic pin portion 20 and 120 is made of stainless steel and the tine end is smoothly polished and edges rounded. After the diaper is folded about the infant's body and the overlapping ends properly gathered, the pin portion 20 is inserted between the infant's body and the diaper layers with the tine pointing outwardly, away from the body of the infant thus avoiding the possibility of pricking the infant with the tine. When the diaper layers are placed between the guard 23 and the tine 22, said tine is pressed to perforate the diaper layers after which the guard is released to return into tine engagement under its own biasing effect.

What is claimed is as follows:

1. A safety pin consisting of a rigid, metallic member bent at each end to form an angular portion, one providing a tine, the other a mounting leg at the respective ends of said member; an elongated rubber clamp-guard one end of which is vulcanized to said mounting leg, the other end of said clamp-guard extending over the tine and engaging and pressing upon said tine solely in response to the inherent bias of said rubber clamp-guard; and a central longitudinal rib formed integral with said clamp-guard.

2. A safety pin in accordance with claim 1, in which the rubber clamp-guard is provided with a substantially stiff and impenetrable disc alined with the tine but in the side of the clamp-guard opposite that engaged by the tine.

References Cited in the file of this patent

UNITED STATES PATENTS

| Number | Name | Date |
|---|---|---|
| Re. 21,271 | Gustlin | Nov. 21, 1939 |
| 74,301 | Candee | Feb. 11, 1868 |
| 91,573 | Smith | June 22, 1869 |
| 447,959 | Leeman | Mar. 10, 1891 |
| 1,199,373 | Hagelstein | Sept. 26, 1916 |
| 1,993,067 | Littlefield | Mar. 5, 1935 |
| 2,268,644 | Dahlberg | Jan. 6, 1942 |